United States Patent [19]
Berardicurti

[11] Patent Number: 5,538,120
[45] Date of Patent: Jul. 23, 1996

[54] CLUTCH BRACKET RETAINER FOR TORQUE SENSING CLUTCH MECHANISMS

[75] Inventor: Daniel Berardicurti, Hilton, N.Y.

[73] Assignee: Lencco Racing Company, Inc., Hilton, N.Y.

[21] Appl. No.: 403,198

[22] Filed: Mar. 13, 1995

[51] Int. Cl.⁶ ............................................. F16D 43/204
[52] U.S. Cl. ........................... 192/54.52; 192/93 A
[58] Field of Search ........................ 192/54.52, 54.5, 192/54.1, 93 A, 93 R

[56] References Cited

U.S. PATENT DOCUMENTS

| | | | |
|---|---|---|---|
| 2,530,796 | 11/1950 | Weyant | 192/54.52 |
| 2,728,429 | 12/1955 | Kershner | 192/54.52 X |
| 4,378,221 | 3/1983 | Huff et al. | 192/93 A X |

FOREIGN PATENT DOCUMENTS

| | | | |
|---|---|---|---|
| 2-225827 | 9/1990 | Japan | 192/54 |

*Primary Examiner*—Andrea L. Pitts
*Attorney, Agent, or Firm*—M. Lukacher

[57] ABSTRACT

The retainer is a circular cam follower plate having therethrough three arcuate slots arranged coaxially of the axis of the plate. Each of the slots has a roller follower mounted in one end thereof for rotation about an axis extending transversely of the associated slot. The axes of the roller followers lie in a common plane disposed approximately coplanar with one side of the plate so that part of each roller is positioned within its associated slot, and the remainder projects beyond said one side of the plate. This permits the plate to be substituted for corresponding original equipment plates used in the clutches of continuous variable transmission of the type employed in snowmobiles, and the like, without requiring replacement of the associated cam which drives the follower plate.

12 Claims, 3 Drawing Sheets

CLUTCH BRACKET RETAINER FOR TORQUE SENSING CLUTCH MECHANISMS

BACKGROUND OF THE INVENTION

This invention relates to clutch mechanisms, and more particularly to an improved clutch mechanism for use in continuous variable transmissions. Even more particularly, this invention relates to an improved clutch bracket retainer or cam follower plate for a snowmobile drive system of the type which utilizes a torque sensing clutch.

Torque sensing clutches, for example the type employed in snowmobiles sold under the trademark ARCTIC CAT, are subjected to rigorous wear and tear, and as a consequence require frequent repair or replacement of parts. The subject matter of this invention concerns a torque sensing clutch mechanism of the type which includes a spring-loaded cam follower plate or bracket retainer, which has mounted thereon a plurality of cam followers that are designed to have sliding or rolling engagement with the ramps of an associated cam in response to variations in the torque applied to the mechanism.

Heretofore, as noted hereinafter, it has been customary for certain continuous variable transmissions (CVT) manufacturers to employ plastic buttons as cam followers in the torque sensing clutch mechanism of the transmission. The buttons are fixed to a retainer plate, or cam follower plate, and are designed to have sliding engagement with the camming surfaces on the associated cam ramps. Also, because such buttons tend to wear out rather quickly, and thus require frequent replacement, efforts have been made to improve upon the cam followers by utilizing, instead of the plastic buttons, roller followers mounted on needle bearings. However, the problem with the later development, as noted hereinafter, is that the roller followers that are mounted on needle bearings are very expensive; and the retainer plates which support the roller followers must be so modified that they require the use of special cams which differ in configuration from the cam employed in the original clutch mechanism.

It is an object of this invention, therefore, to provide for transmissions of the type described an improved clutch bracket retainer or cam follower retainer, which eliminates the need for employing plastic buttons as cam followers, and which also obviates the need for replacing the associated cam, when and if the cam retainer or follower plate is replaced.

Other objects of this invention will be apparent hereinafter from the specification and from the recital of the appended claims, particularly when read in conjunction with the accompanying drawings.

SUMMARY OF THE INVENTION

Mounted on the inside surface of a circular bracket retainer, or cam follower plate, and at each of three equiangularly spaced points about the axis of the plate, is a cam roller follower. Each roller follower rotates coaxially about a metal sleeve which is fixed to and surrounds a cylindrical mounting pin, opposite ends of which are secured in registering, arcuate grooves formed in the inside surface of the follower plate, and so that the outer peripheral surface of each roller follower has rolling engagement with the camming surface or ramp formed on one of three teeth which project from an adjacent cam.

The axis of rotation of each roller follower is approximately coplanar with the inside surface of the cam follower plate, whereby each roller follower projects into and rotates between the sidewalls of one of three arcuate slots or openings formed in the plate to accommodate the teeth of the cam. This construction minimizes the extent to which the roller followers project from the inside surface of the follower plate, and places the ramp engaging surfaces of the followers in the same positions which would be occupied by the plastic buttons of a conventional follower plate. This enables applicant's novel follower plate and its associated roller followers to be employed in combination with a standard clutch cam of the type employed by manufacturers of ARCTIC CAT snowmobiles and the lime.

THE DRAWINGS

DETAILED DESCRIPTION OF THE PREFERRED EMBODIMENTS

Figure 1:
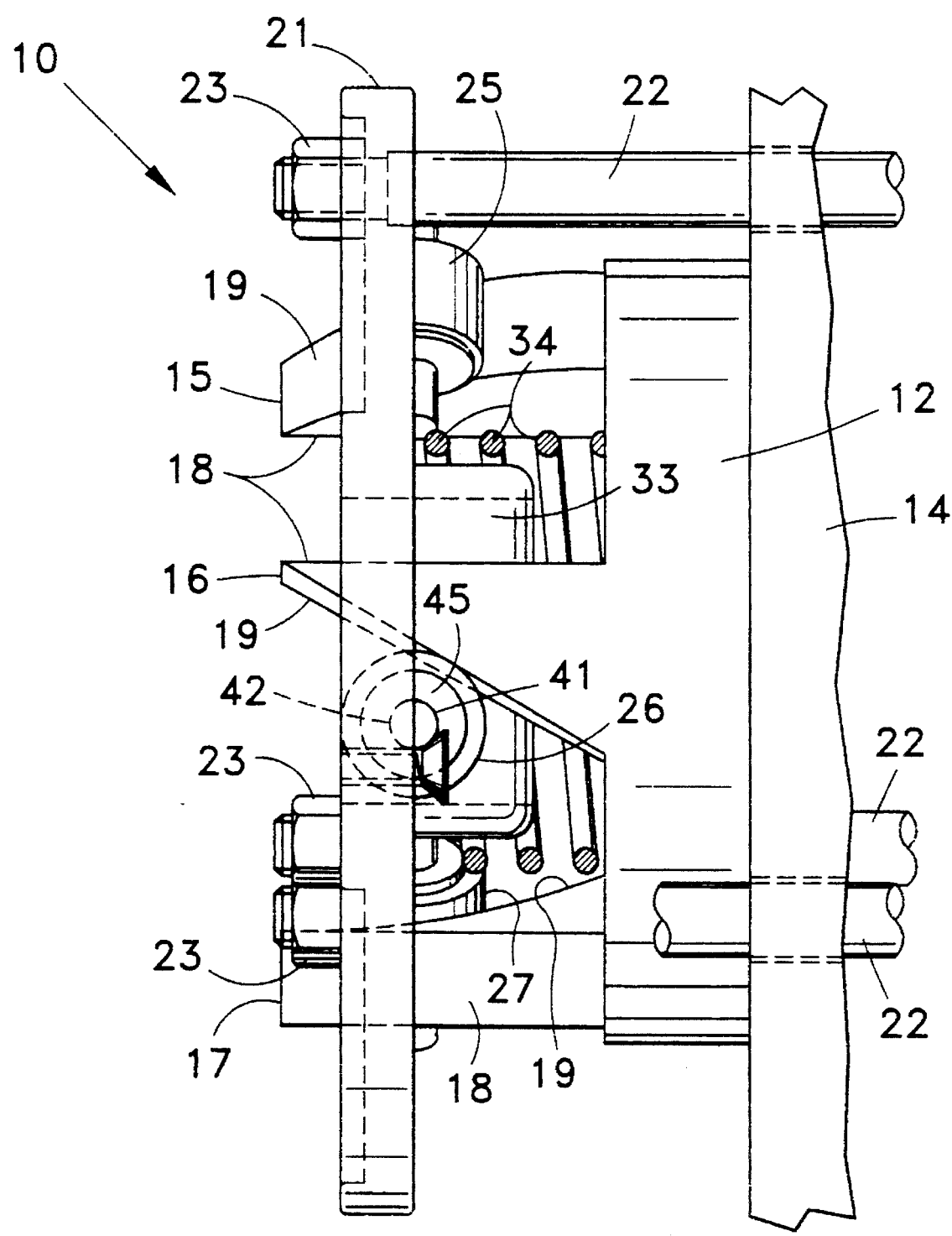
FIG. 1 is a fragmentary side elevational view of part of a torque sensing clutch mechanism having an improved clutch bracket retainer or cam follower plate therefor made according to one embodiment of this invention.

Referring now to the drawings by numerals of reference, and first to FIGS. 1 to 3, 10 denotes generally part of a torque sensing clutch mechanism of the type commonly employed in certain snowmobiles. This mechanism comprises an annular cam 12 secured at one end thereof to a drive plate 14, which is mounted for rotation coaxially of the annular cam 12, and which also is secured against axial movement. Projecting from the opposite end of cam 12 at equiangularly spaced points thereabout are three camming teeth 15, 16 and 17. Each of these teeth has a straight edge 18 extending parallel to the axis of the cam 12, and a segmental helical camming surface or ramp 19, which extends coaxially of the axis of cam 12.

Each of the three camming surfaces 19 of the cams 15, 16 and 17, respectively, is adapted to have rolling engagement with one of three, identical roller followers 25, 26 and 27, respectively. These roller followers are rotatably mounted on a retainer or cam follower plate 21 in a manner which will be described in greater detail hereinafter.

Figure 2:
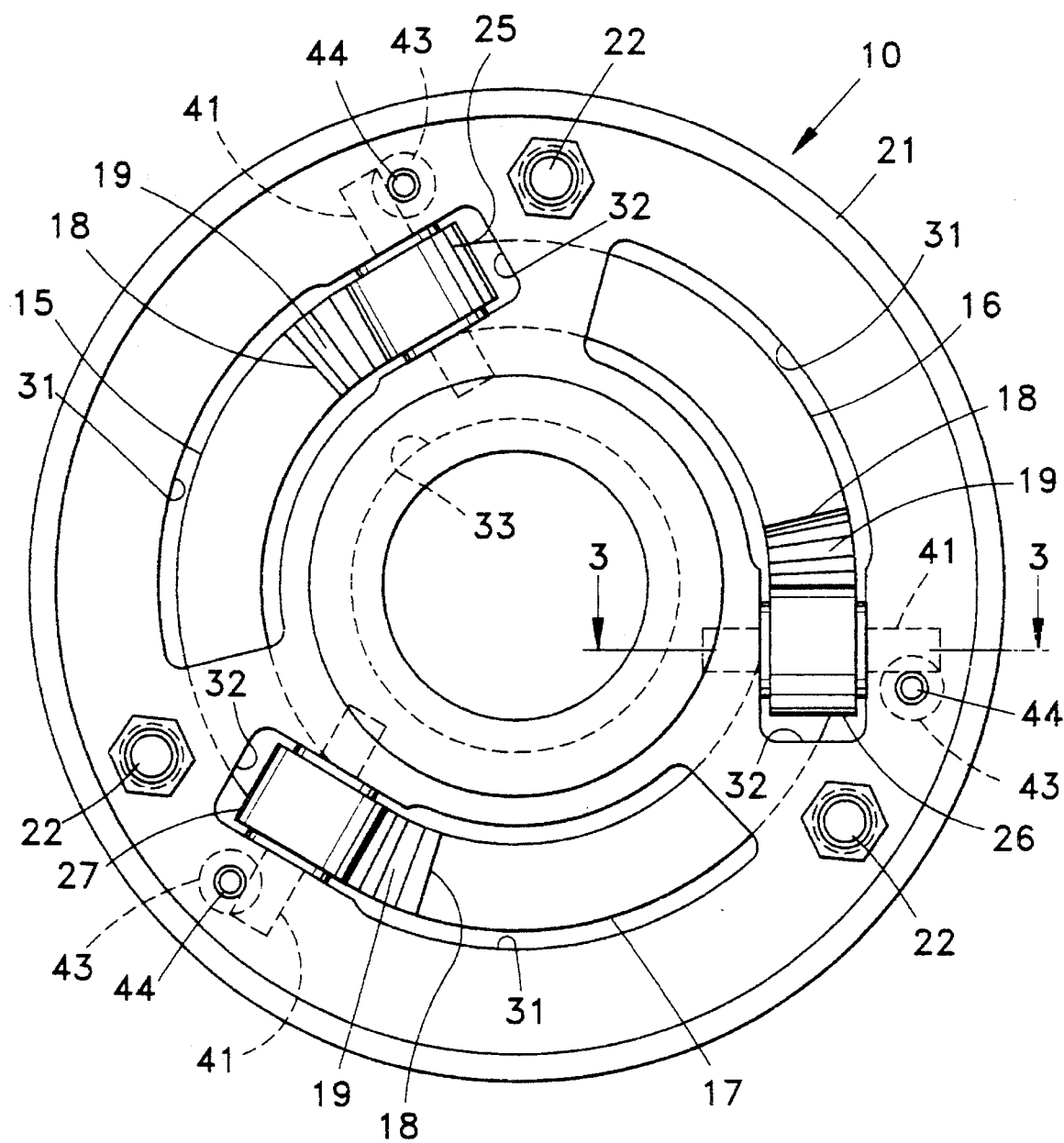
FIG. 2 is an end elevational view of this mechanism as seen when looking at the left end of the mechanism as shown in FIG. 1.

Plate 21 is mounted for limited axial movement toward and away from plate 14 by three axially extending mounting bolts 22, which are equi-angularly spaced to the axis of cam 12. At one end (the left end thereof as shown in FIG. 1), each bolt 22 is secured by a nut 23 to plate 21, and at its opposite end extends slidably through a registering opening in the plate 14 to another portion of the clutch mechanism, which forms no part of this invention. To permit this limited axial movement of plate 21, the plate has therethrough three, equi-angularly spaced, arcuate openings or slots 31, which are disposed coaxially of the axis of cam 12, and which register with the cam teeth 15, 16 and 17 so that the teeth can extend through these openings as plate 21 shifts axially toward and away from plate 14. At one end thereof (the clockwise end as shown in FIG. 2) each slot 31 opens on a slightly narrower slot or notch 32 which forms a slight extension of each slot 31 for a purpose noted hereinafter.

Projecting from the inner face of plate 21 (the right side of the plate as shown in FIG. 1) is an annular flange or boss 33, which surrounds a central opening in plate 21. Boss 33 extends coaxially into one end of a coiled tension spring 34, one end of which is attached to plate 21, and the opposite end of which (not illustrated) extends coaxially through the bore in cam 12 and a registering opening in plate 14 to the remaining portion of the clutch mechanism (not illustrated) which responds to the axial movement to plate 21 relative to plate 14. The manner in which spring 34 is connected at opposite ends thereof to plate 21 and to the remaining portion of the clutch mechanism forms no part of this invention, and therefore will not be described in greater detail herein. Suffice it to say that tension spring 34 normally urges plate 21 resiliently and axially toward plate 14.

Figure 3:
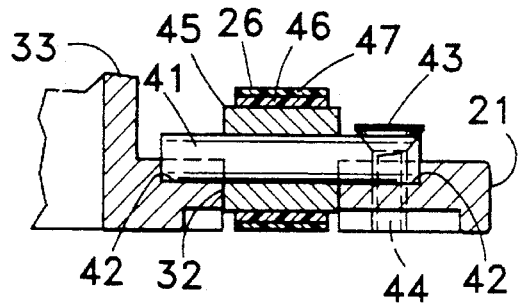
FIG. 3 is a fragmentary sectional view of part of this retainer or follower plate taken along the line 3—3 in FIG. 2 looking in the direction of the arrows.

Referring now to FIG. 3, each of the rollers 25, 26 and 27 is similar in configuration and is similarly mounted on the plate 21, so only one such roller (roller 26) will be described in detail hereinafter. As shown in FIG. 3, roller 26 comprises an elongate pin 41, or the like, which is snugly or press fit at opposite ends thereof into registering, arcuate grooves 42 that are formed in the inside surface of plate 21 (the surface which faces plate 14) to extend transversely of a respective slot extension 32. For example, as shown in FIG. 2, each of the mounting pins 41 for the roller followers 25, 26 and 27 is mounted in the notch or recess 32 formed in the clockwise-most end of the associated slot 31. Moreover, as shown in FIGS. 1 and 3, each groove or recess 42 has a depth approximately equal to one-half the diameter of the associated pin 41. In addition, each pin 41 is secured snugly into its registering grooves 42 by means of at least one machine screw 43 having an enlarged-diameter, tapered head which overlies and engages a portion of each pin 41 adjacent one end thereof, and which has an externally threaded shank portion 44 which threads downwardly into plate 21 securely to fix the associated pin 41 against movement on plate 21.

Fixedly secured to each pin 41 intermediate its ends, and coaxially thereof, is an annular, metal sleeve 45. As shown more clearly in FIG. 3, each of the roller followers 25, 26 and 27, which is rotatable coaxially about the axis of its associated pin 41, comprises a plastic, ring-shaped bearing 46, which rotates directly on the outer peripheral surface of the metal sleeve 45, and an annular, ring-shaped layer 47 of rubber, or the like, which is secured to the outer peripheral surface of the bearing 46, and which rotates with bearing 46 coaxially about sleeve 45. Any axial shifting of the roller 26 (rings 46, 47) about the associated sleeve 45 is limited by engagement of opposite ends of the roller 26 with one or the other of the confronting, opposed side surfaces of the associated slot extension 32.

Figure 4:
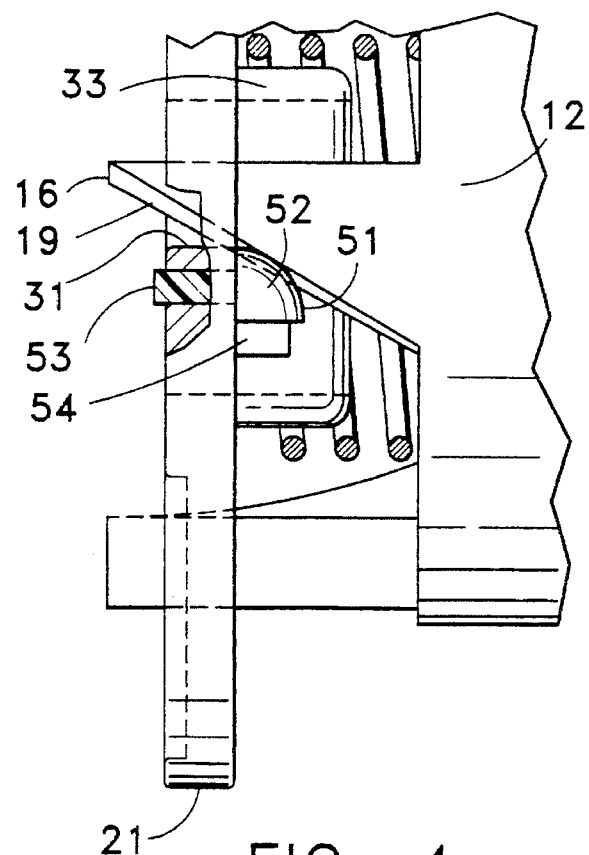
FIG. 4 is a fragmentary side elevational view of a portion of the clutch mechanism shown in FIG. 1, but illustrating one type of a prior art cam follower plate heretofore employed in such mechanisms, a portion of the plate being broken away and shown in section.

Referring now to the prior art camming mechanism shown in FIG. 4, wherein like numerals are employed to denote elements similar to those employed in the embodiment shown in FIGS. 1 to 3, each of the teeth of the cam 12, only one of which teeth (tooth 16) is illustrated in FIG. 4, is disposed to have its camming surface 19 slidably engaged with the curved surface 51 of one of the above-noted plastic button cam followers denoted by the numeral 52. Each button 52 is fixed to the surface of the retainer plate or cam follower plate 21 via an integral, reduced-diameter stem 53, which is secured in a registering opening formed in plate 21 in the space between the ends of adjacent cam slots 31. At the side opposite its curved surface 51 each button is seated against a reinforcing lug 54 that is fixed to the surface of plate 21. As plate 21 shifts axially, the curved surface 51 of each button 52 will have sliding engagement with the associated camming surface 19. As noted above, this sliding contact between the button surface 51 and the camming surface 19 soon causes the surface of button 52 to wear, and therefore requires that the plate 21 be replaced by a new plate 21 having fixed thereon a new set of buttons or followers 52.

Figure 5:
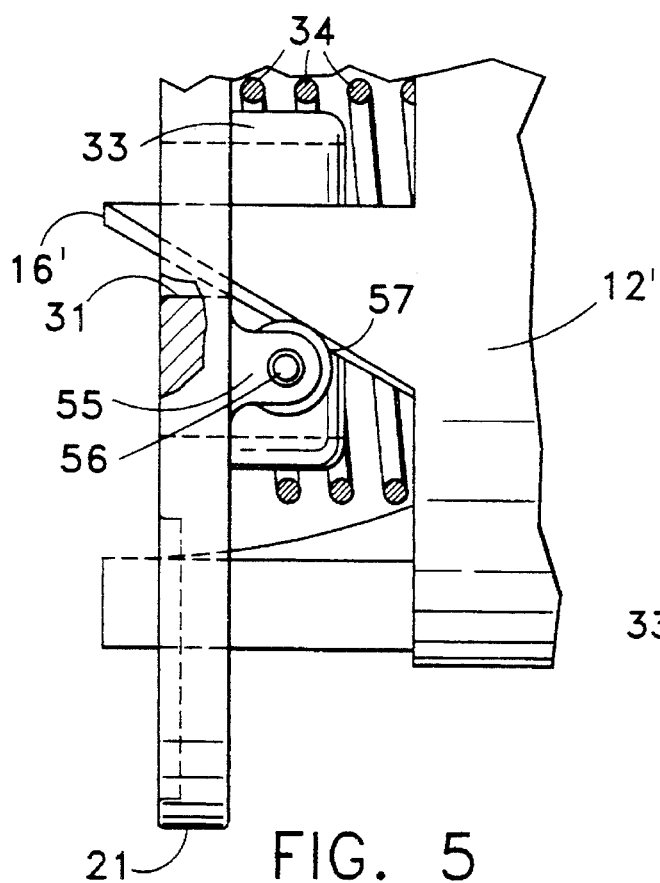
FIG. 5 is a fragmentary sectional view of part of a mechanism generally similar to that shown in FIG. 4, but showing still another prior art cam follower plate and associated cam heretofore employed in such mechanisms.

To achieve longer life for the cam followers, it has been proposed that the buttons 52 be replaced by roller followers of the type illustrated in FIG. 5. In this construction, the inside face of plate 21 must have secured thereon between the ends of adjacent cam slots 31 or have integral therewith, three stationary trunnions or lugs 55, each of which projects a rather substantial distance from the inside face of plate 21. Mounted at one end in the bore in each of the trunnions 55 is one end of a roller supporting shaft 56, the opposite end of which has supported thereon by a plurality of needle bearings (not illustrated) a roller follower 57. The roller followers 57, however, are not designed for use in conjunction with a cam of the type denoted at 12 in FIGS. 1 through 4. Consequently, the cam 12' and its associated tooth 16' as shown in FIG. 5, must be different from cam 12. Therefore, if it is desired to substitute the retainer plate of FIG. 5 for the cam follower plate of FIG. 4, which bears the plastic buttons 52 as original equipment, it is necessary to replace not only the plate 21 but also the cam 12. The reason for that is because, while the axis of rotation of each roller 57 is axially spaced from the inside surface of its mounting plate 21, the axes of rotation of the rollers 25, 26 and 27, like the axes of the curved surfaces 51 of buttons 52, lie substantially in a plane containing the inside surface or inside face of plate 21. Therefore, not only are the needle bearing roller followers 57 far more expensive than the roller followers of FIGS. 1 to 3, the replacement cost when employing a clutch mechanism of the type shown in FIG. 5 is substantially greater because of the additional requirement of having to replace the cam 12 with a new cam 12'.

Accordingly, it will be apparent that the present invention provides a relatively simple and inexpensive means for replacing the plastic button-type roller follower 52 with a rotatable roller follower which is substantially more inexpensive and simpler to install than followers of the type shown in FIG. 5. Basically, in order to replace the plate 21 bearing the plastic buttons 52, one need only to remove the buttons 52 and lugs 54, extend each slot 31 to form at one end the notch 32, and then form at equi-angularly spaced points about the axis of the plate three sets of registering notches or grooves 42 for accommodating opposite ends of the roller mounting pins 41. Simple rollers 25, 26 and 27 may then be mounted via their associated pins 41 on the inner face of the plate 21 where their associated pins will be secured against movement by the machine screws 43. Plate 21 can then be mounted on the associated clutch mechanism without having to replace the associated cam 12. As noted above, the curved camming surface 51 on each plastic button 52 forms an arcuate surface the axis of which is approximately coplanar with the inside face of plate 21, so that the rolling surfaces formed by the rollers 25, 26 and 27 will conform substantially to the same, curved follower surfaces 51 previously provided by the plastic buttons 52.

Figure 6:
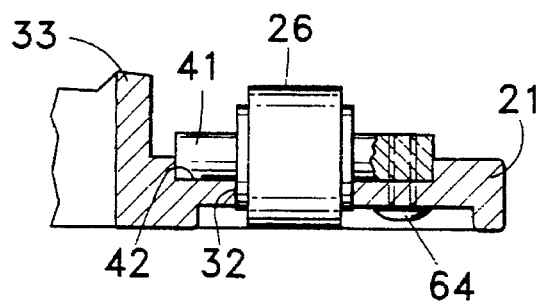
FIG. 6 is a fragmentary sectional view similar to FIG. 3 but showing another embodiment of this invention.

As shown in FIG. 6, instead of using the ovelapping heads of screws 43 for securing the roller mounting pins 41 in recesses 42, screws 64 could be threaded through plate 21 and directly into each pin 41 to secure it to plate 21. Also, if the plate 21 were thicker, or the recesses 42 were deeper, each screw 64 could engage its associated pin along a path extending axially of the pin rather than transversely thereof as shown in FIG. 6.

Although the mounting pins 41 for the rollers 25–27 have been shown to be seated in registering recesses in the inside surface of the plate 21, and are secured therein by the screws 43 or 64, it will be readily apparent to one skilled in the art that alternative means of mounting the rollers 25–27 can be utilized without departing from this invention, provided that the ramp engaging surfaces of the roller followers 25–27 will be positioned axially of clutch mechanism 10 in positions similar to the curved surfaces of the buttons 52 which they replace. In that way it will be possible for the herein disclosed roller followers 25–27 to be employed in combination with a cam 12 which would be identical to the cam 12 that is employed with the follower plate 21 that utilizes the plastic button followers 52 as shown in FIG. 4.

Moreover, while this invention has been illustrated and described in detail in connection with only certain embodiments thereof, it will be apparent that this application is intended to cover any such modifications as may fall within the scope of one skilled in the art, or the appended claims.

I claim:

1. In a torque sensing clutch mechanism of the type including a rotary drive member, a rotary driven member mounted in spaced, confronting relation to said drive member such that said members have confronting surfaces, and a cam extending between the confronting surfaces of said members, said cam being carried by said drive member and having thereon a plurality of spaced ramps projecting into registering openings in the confronting surface of said driven member, improved cam follower means on said driven member engaged with said ramps to impart rotation and limited axial movement to said driven member upon rotation and limited axial movement to said driven member upon rotation of said drive member, comprising a plurality of rollers equal in number to said ramps, and means mounting said rollers on said driven member for rotation by said ramps about spaced axes which lie in a common plane, each of said rollers extending into said confronting surface of said driven member adjacent one end of each of said openings in said confronting surface.

2. A torque sensing clutch mechanism of the type defined in claim 1, wherein said common plane is approximately coplanar with said confronting surface of said driven member.

3. A torque sensing clutch mechanism of the type as defined in claim 1, wherein said confronting surface of said driven member has therein adjacent said one end of each of said openings a pair of spaced, registering grooves extending transversely of the associated opening, said mounting means comprises a plurality of shafts equal in number to said rollers and each of said rollers being mounted on one of said shafts intermediate the ends thereof, and for rotation coaxially thereof, and each of said shafts being seated at opposite ends thereof in each of said pair of registering grooves in said confronting surface of said driven member.

4. A torque sensing clutch mechanism of the type as defined in claim 3, including at least one fastening element securing each of said shafts to said driven member.

5. A torque sensing clutch mechanism of the type as defined in claim 4, wherein each of said fastening elements comprises a screw threaded through said driven member and into each of said shafts adjacent one end thereof.

6. A torque sensing clutch mechanism of the type as defined in claim 4, wherein each of said fastening elements comprises a screw having an externally threaded shank threaded into said driven member adjacent one end of one of said shafts, and having an enlarged diameter head overlying said one end of said shaft to prevent removal of said shaft from the associated pair of grooves in which it is seated.

7. In a torque sensing clutch mechanism of the type as defined in claim 1, wherein said registering openings in said confronting surface of said driven member comprise a plurality of arcuate slots equiangularly spaced coaxially about the axis of rotation of said driven member, each of said slots having in one end thereof a notch slightly narrower than the width of its associated slot, and each of said rollers having a portion of one diametral side thereof registering with and extending into each of said notches.

8. In a torque sensing clutch mechanism of the type including a rotary drive member, and a cam secured at one end to one side of said drive member for rotation thereby, and having a plurality of spaced ramps projecting from the opposite end of said cam coaxially of its axis of rotation, an improved cam follower, comprising a plate having therein a plurality of arcuate slots equiangularly spaced coaxially of a first axis, a roller mounted in each of said slots adjacent one end thereof for rotation about an axis extending transversely of its associated slot and said first axis, at least a portion of one diametral side of each of said rollers being positioned within its associated slot, and at least a portion of the other diametral side of each roller extending beyond one side of said plate, and means for mounting said plate in said mechanism with said one side thereof disposed in spaced, confronting relation with said one side of said drive member, and with said ramps extending into said slots coaxially of said first axis and into operative engagement with said rollers.

9. In a torque sensing clutch mechanism of the type as defined in claim 8, wherein the axes of rotation of said rollers lie in a common plane approximately coplanar with said one side of said plate.

10. In a torque sensing clutch mechanism of the type as defined in claim 9, wherein each of said rollers rotates on a shaft having reduced-diameter ends projecting coaxially from opposite ends of the associated roller, adjacent said one end of each of said slots in said plate, said one side of said plate has therein a pair of spaced, registering grooves with confronting ends which open on opposite sides of the associated slot, and the reduced-diameter opposite ends of each of said shafts are seated in and secured to one of said pairs of registering grooves.

11. In a torque sensing clutch mechanism of the type as defined in claim 10, wherein portions of said reduced-diameter ends of said shafts project at one diametral side thereof beyond said one side of said plate.

12. In a torque sensing clutch mechanism of the type as defined in claim 11, wherein adjacent said one end of each of said slots at least one screw has a shank portion thereof threaded into said one side of said plate, and has an enlarged diameter head portion engaged with one of the reduced-diameter ends of one of said shafts to secure said shafts on which said rollers rotate to said plate.

* * * * *